United States Patent [19]
Sasaki et al.

[11] Patent Number: 5,564,323
[45] Date of Patent: Oct. 15, 1996

[54] CIRCULAR SAW UNIT

[75] Inventors: Katsuhiko Sasaki; Kouji Matubara, both of Anjo, Japan

[73] Assignee: Makita Corporation, Japan

[21] Appl. No.: 399,938

[22] Filed: Mar. 6, 1995

[30] Foreign Application Priority Data

Mar. 7, 1994 [JP] Japan .................... 6-035995

[51] Int. Cl.⁶ .................................. B27B 5/26
[52] U.S. Cl. .................. 83/471.3; 83/581; 83/490; 83/467.1
[58] Field of Search .............. 83/468.1, 468.7, 83/581, 490, 471.3, 471, 477.2, 456, 466, 467.1; 269/289 R, 312; 144/286 R, 287

[56] References Cited

U.S. PATENT DOCUMENTS

| | | | |
|---|---|---|---|
| 2,208,582 | 7/1940 | Hollister | 83/471.3 |
| 2,313,617 | 3/1943 | Bray | 83/471.3 |
| 3,964,361 | 6/1976 | Allaire | 83/471.3 |
| 3,994,192 | 11/1976 | Faig | 83/490 |
| 4,537,105 | 8/1985 | Bergler . | |
| 5,042,348 | 8/1991 | Brundage et al. . | |
| 5,060,548 | 10/1991 | Sato et al. . | |
| 5,146,825 | 9/1992 | Dehari . | |
| 5,146,826 | 9/1992 | Shiotani et al. | 83/471.3 |
| 5,357,834 | 10/1994 | Ito et al. . | |

FOREIGN PATENT DOCUMENTS

| | | |
|---|---|---|
| 0622145 | 2/1994 | European Pat. Off. . |
| 3347920 | 8/1985 | Germany . |
| 4323640 | 1/1995 | Germany . |
| 2-80401 | 6/1990 | Japan . |
| 3-79901 | 8/1991 | Japan . |
| 4-130804 | 12/1992 | Japan . |

Primary Examiner—Rinaldi I. Rada
Assistant Examiner—Allan M. Schrock
Attorney, Agent, or Firm—Dennison, Meserole, Pollack & Scheiner

[57] ABSTRACT

A circular saw unit includes a base having a work support device for supporting a work. A turntable is rotatably mounted on the base. A cutting mechanism is adapted for cutting the work placed on the work support device. The work support device includes at least one work support member pivotally mounted on the base around a pivotal axis substantially parallel to a rotational axis of the turntable. The work support member has an upper surface for placing the work thereon.

6 Claims, 7 Drawing Sheets

CIRCULAR SAW UNIT

BACKGROUND OF THE INVENTION

1. Field of the Invention

The present invention relates to a circular saw unit such as a miter saw and a slide miter saw having a base, a turntable and a cutting mechanism.

2. Description of the Prior Art

A conventional circular saw unit having a turntable is disclosed in Japanese Laid-Open Utility Model Publications Nos. 3-79901, 4-130804 and 2-80401. The circular saw units disclosed in these publications have a common basic construction. The construction of the circular saw unit of Publication No. 4-130804 will now be explained with reference to FIG. 8.

FIG. 8 shows a turntable 82 and a base 84 of the circular saw unit in plan view. The turntable 82 has an extension 82a protruding radially from a part of the periphery of the turntable 82. The base 84 has a pair of work placing portions 84a and 84b which are formed on both sides of the base 84 for placing a work thereon. A turntable receiving recess 84c is formed in the central portion of the base 84. A cut-out portion 84d is formed on the front side of the base 84 so as to permit swinging movement of the extension 82a as indicated by an arrow 86 when the turntable 82 is rotated.

A slit 82b is formed in the extension 82a for receiving a part of a circular saw blade (not shown) which is moved vertically within a plane including the slit 82b or which is moved horizontally along the slit 82b. The extension 82a serves to support the work and to permit movement of the saw blade relative thereto. The extension 82a also serves as an operation member operable by an operator for rotating the turntable 82.

In case of the circular saw unit of Publication No. 3-79901, an extension of a turntable does not serve to permit horizontal movement of a cutting blade but serves as an operation member for rotating the turntable. The extension of this publication has a handle for fixing the position of the turntable.

In any of the circular saw units of the above publications, an oblique cutting operation of the work can be performed by varying the rotational position of the turntable.

Although the circular saw unit of this type is excellent in operation, it involves a problem that an effective width W for supporting the work cannot be broaden without causing interference between the extension 82 and the work placing portion 84a or 84b when the extension 82 is swung. Thus, when the effective width W is broadened, the range of swinging movement of the extension 82a becomes shallower. On the other hand, when the range of swinging movement of the extension 82a is broadened, the effective width W becomes narrower.

Of course, a broader effective width W can be obtained if the size of the circular saw unit is greater. However, in this case, the circular saw unit is difficult to be conveyed, and a larger space is required for storing the circular saw unit. Therefore, this measure does not provide an essential solution to the above problem.

SUMMARY OF THE INVENTION

It is, accordingly, an object of the present invention to provide a circular saw unit which permits a greater effective width for supporting a work without enlarging the size of the circular saw unit.

It is another object of the present invention to provide a circular saw unit which permits a greater effective width for supporting a work without narrowing the swingable range of an extension protruding radially from a turntable.

It is a further object of the present invention to provide a circular saw unit which is excellent in operability.

According to the present invention, there is provided a circular saw unit comprising:

a base having work support device for supporting a work;

a turntable rotatably mounted on the base; and a cutting mechanism for cutting the work supported by the work support device;

the work support device including at least one work support member pivotally mounted on the base around a pivotal axis substantially parallel to a rotational axis of the turntable, the work support member having an upper surface for placing the work thereon.

The invention will become more apparent from the appended claims and the description as it proceeds in connection with the drawings.

DETAILED DESCRIPTION OF THE PREFERRED EMBODIMENT

First and second embodiments of the present invention will now be explained with reference to the accompanying drawings.

(FIRST EMBODIMENT)

Figure 1:
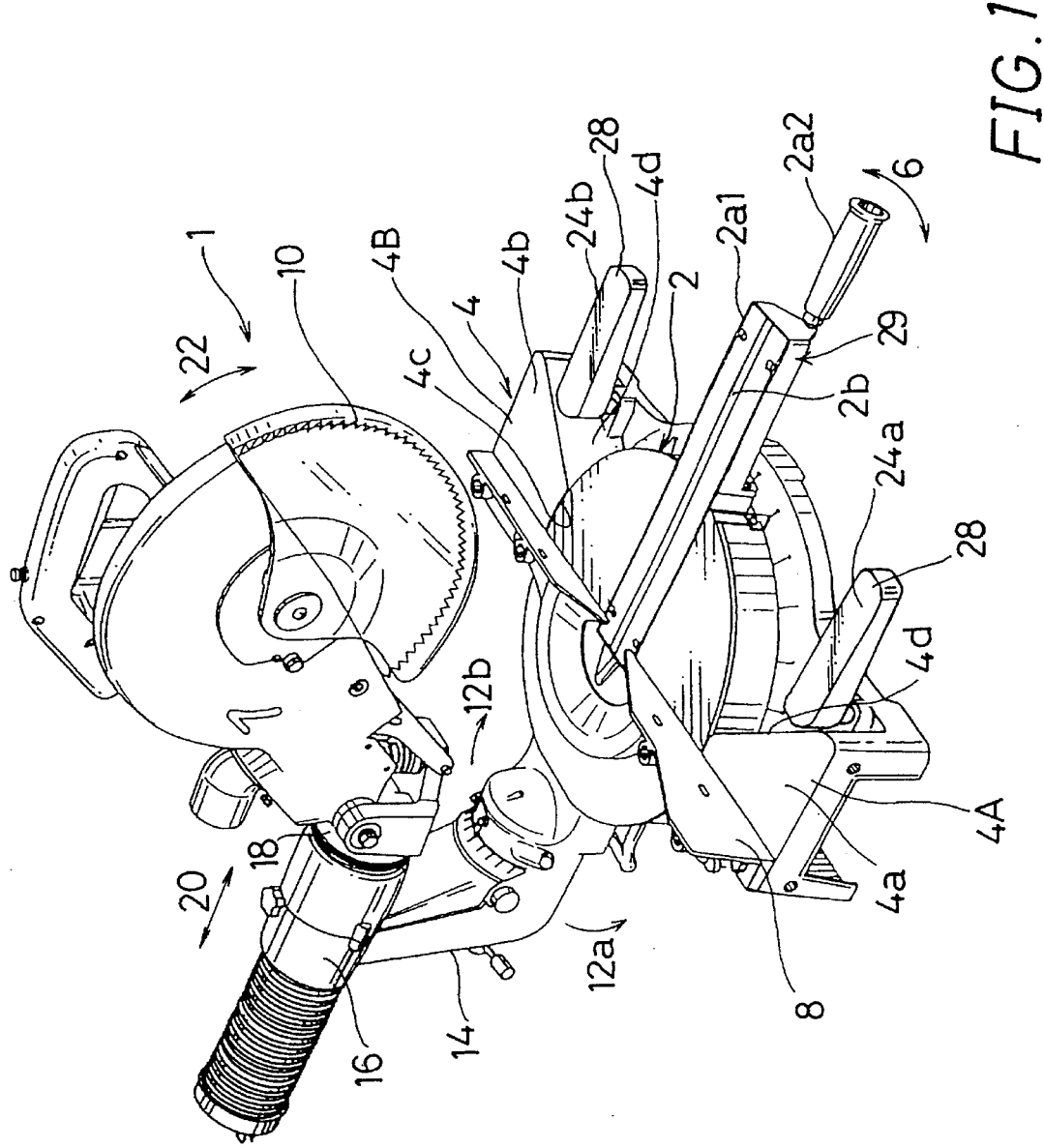
FIG. 1 is a perspective view of a slide miter saw according to a first embodiment of the present invention.
Figure 2:
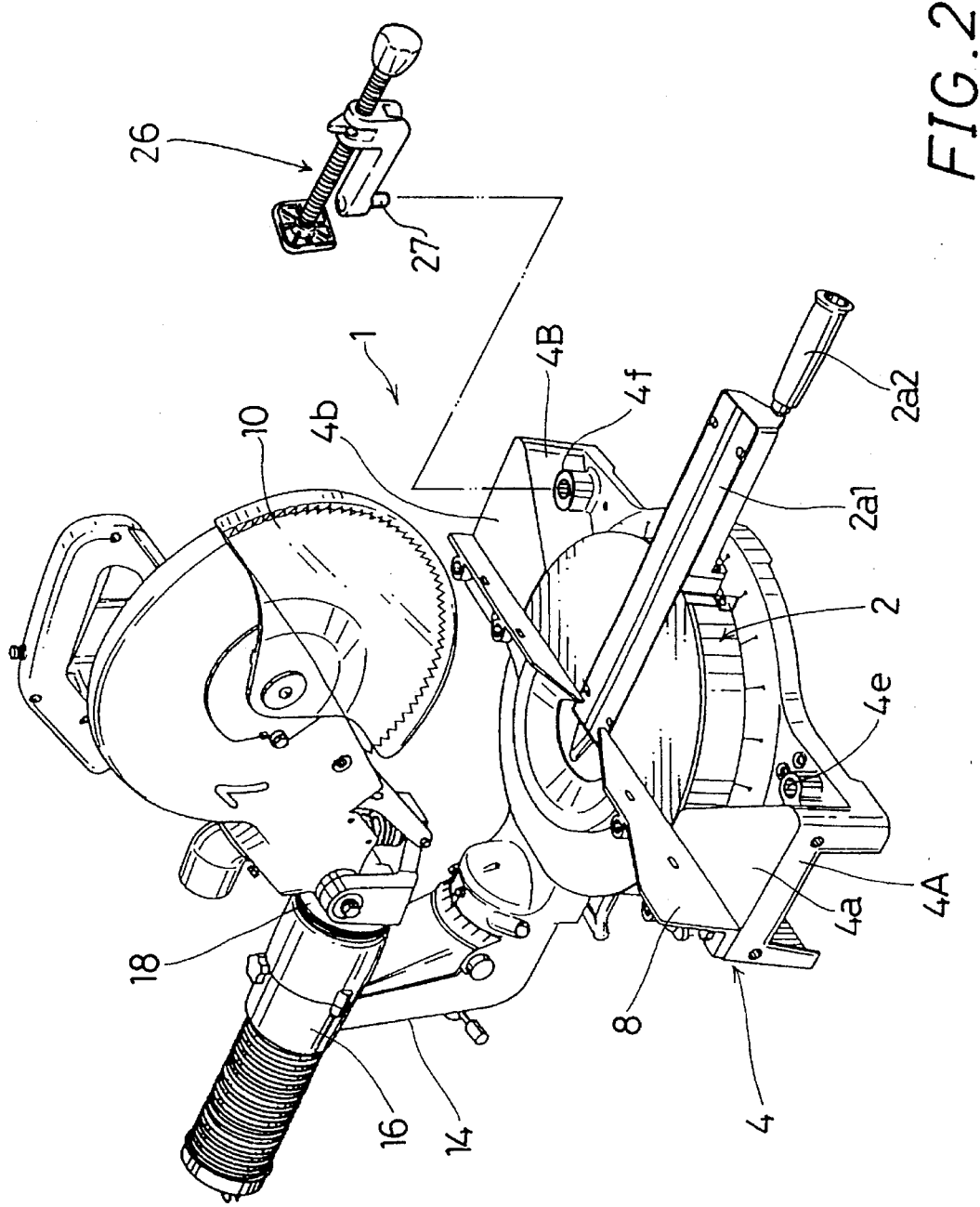
FIG. 2 is a view similar to FIG. 1 but showing the state where work support members are removed for mounting a vertical vice on a base.

Referring to FIGS. 1 to 4, there is shown a slide miter saw 1 according to the first embodiment of the present invention. As best shown in FIGS. 1 and 2, the slide miter saw 1 includes a turntable 2, a base 4 and a cutting mechanism having a circular saw blade 10. The base 4 has a pair of work support portions 4A and 4B disposed on both sides of the base 4 and opposed to each other in a diametrical direction of the turntable 2. The work support portions 4A and 4B have upper surfaces or work placing surfaces 4a and 4b, respectively, for placing thereon a work (not shown) to be cut. The turntable 2 is received within a recess 4c formed in a central portion of the base 4 and has an upper surface which is flush with the work placing surfaces 4a and 4b. An extension 2a1 is mounted on the turntable 2 and extends radially outwardly from the turntable 2 at a position forwardly of the base 4.

The extension 2a1 has an upper surface flush with the upper surface of the turntable 2 and serves mainly to support the work. A slit 2b is formed on the upper surface of the extension 2a1 in a longitudinal direction thereof. The slit 2b serves to receive the saw blade 10 when the work is cut. A handle 2a2 is mounted on an outer end of the extension 2a1 and is rotatable around its own axis relative to the extension 2a1. When the handle 2a2 is rotated in a clockwise direction, the turntable 2 is fixed in position relative to the base 4. On the other hand, when the handle 2a2 is rotated in a counterclockwise direction, the turntable 2 is free to rotate relative to the base 4. The base 4 has a cut-out portion 4d at a position forwardly of the central portion thereof so as to permit swinging movement of the extension 2a1 indicated by an arrow 6 for rotating the turntable 2. A fence 8 extends between the work placing surfaces 4a and 4b and is fixed thereto in the diametrical direction of the turntable 2. The fence 8 is adapted for abutment of a lateral edge of the work thereon so as to define a widthwise position of the work.

A support member 14 is mounted on the turntable 2 at a position opposite to the extension 2a1. The support member 14 is pivotable relative to the turntable 2 around an axis extending in the diametrical direction of the turntable 2 as indicated by arrows 12a and 12b. A holder 16 is fixedly mounted on an upper end of the support member 14. A slide bar 18 is slidably supported by the holder 16 and has a forward end on which the cutting mechanism having the saw blade 10 is vertically pivotally mounted as indicated by an arrow 22. The cutting mechanism has a motor (not shown) disposed on the right side of the saw blade 10 in FIG. 1 for driving the saw blade 10.

With the above construction, an angle of the cutting blade 10 relative to the work which is placed on the base 4 and which extends along the fence 8 can be varied by rotating the turntable 2, so that an oblique cutting operation can be performed to cut the work obliquely relative to a widthwise direction of the work in plan view. Further, by moving the cutting blade 10 together with the slide bar 18 relative to the support member 14 as indicated by an arrow 20, a work having a greater width can be successfully cut.

As shown in FIG. 1, the slide miter saw 1 of this embodiment has a pair of work support members 24a and 24b mounted on the bottom of the recess 4c of the base 4 at positions adjacent and forwardly of the work support portions 4A and 4B, respectively. Each of the work support members 24a and 24b has an upper surface extending flush with the upper surface of the turntable 2 as well as the work placing surfaces 4a and 4b of the work support portions 4A and 4B.

Figure 4:
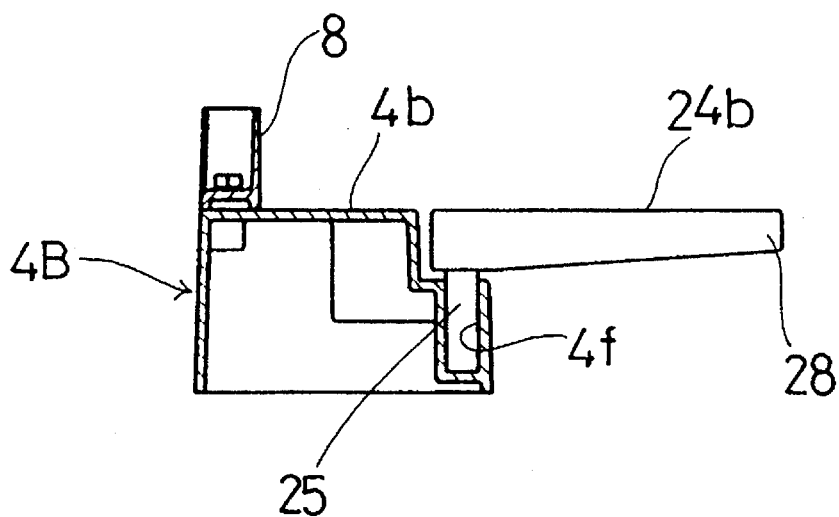
FIG. 4 is a sectional view taken along line IV—IV in FIG. 3.

The construction of the work support member 24a is the same as the construction of the work support member 24b, and therefore, only the construction of the work support member 24b is explained with reference to FIG. 4. The work support member 24b has an elongated configuration and has one end on which a pin 25 is fixedly mounted. The pin 25 extends downwardly from the one end of the work support member 24b. The other end of the work support member 24b is formed as a free end 28. The pin 25 is removably slidably inserted into a mounting hole 4f formed in the bottom of the recess 4c, so that the work support member 24b is pivotable about the pin 25 or an axis of the mounting hole 4f which is parallel to an axis of the turntable 2. Here, as shown in FIG. 2, the mounting hole 4f can be adapted to receive a pin 27 of a horizontal vise 26 which is operable to press the work against the fence 8 so as to fix the work in position in the widthwise direction. Thus, the mounting hole 4f can selectively receive the pin 25 of the work support member 24b and the pin 27 of the horizontal vise 26. A mounting hole 4e corresponding to the mounting hole 4f is formed in the bottom of the recess 4b for receiving the pin 25 of the work support member 24a.

Figure 3:
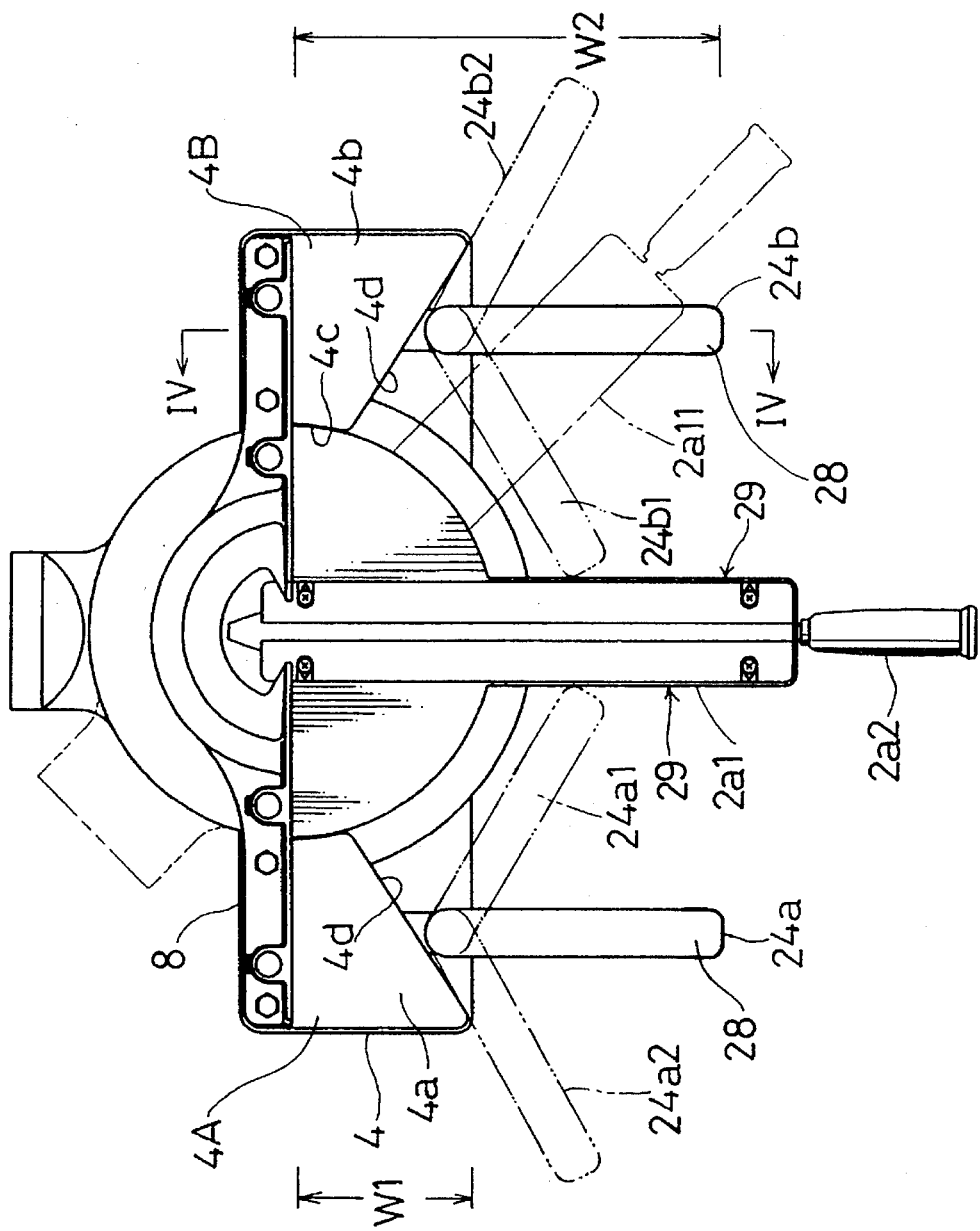
FIG. 3 is a plan view of the base, the work support members and a turntable of the slide miter saw shown in FIG. 1.

With this construction, when the extension 2a1 is positioned at a central position as indicated by solid lines in FIG. 3 for cutting the work in a direction perpendicular to the longitudinal direction thereof, the work support member 24a can be pivoted between two positions indicated by 24a1 and 24a2, respectively. At the position indicated by 24a1, the free end 28 of the work support member 24a abuts on corresponding one of side surfaces 29 formed on both sides of the extension 2a1. On the other hand, at the position indicated by 24a2, one of the lateral sides of the work support member 24a abuts on the support portion 4A. Thus, the pivotal position of the work support member 24a can be selectively determined between these positions 24a1 and 24a2 in response to the size of the work to be supported. Similar to the work support member 24a, the work support member 24b can be pivoted between two positions indicated by 24b1 and 24b2 which correspond to the positions 4a1 and 24a2, respectively. Therefore, the work can be suitably supported by adjusting the pivotal positions of the work support members 24a and 24b.

Here, the length of the work support member 24a is determined such that, when the free end 28 is in abutment on the corresponding side surface 29 of the extension 2a1, the abutting position of the free end 28 is always positioned forwardly of the pivotal axis of the work support member 24a or the axis of the mounting hole 4e. Additionally, the free end 28 is shaped to be rounded. This is also applied to the work support member 24b.

Therefore, as the extension 2a1 is swung in a counterclockwise direction in FIG. 3 from the central position indicated by solid lines toward a position 2a1 as indicated by chain lines, the right side surface 29 of the extension 2a1 abuts on the free end 28 of the work support member 24b which is in a position shown by solid lines or the position indicated by 24b1 within the range of swinging movement of the extension 2a1. Then, the work support member 24b is forced to be pivoted together with the extension 2a1 in a direction toward the position indicated by 24b2.

On the other hand, as the extension 2a1 is swung in a clockwise direction in FIG. 3 from the central position, the left side surface 29 of the extension 2a1 abuts on the free end 28 of the work support member 24a which is in a position shown by solid lines or the position indicated by 24a1 within the range of swinging movement of the extension 2a1. Then, the work support member 24a is forced to pivot together with the extension 2a1 in a direction toward the position indicated by 24a2.

Thus, the work support members 24a and 24b are automatically pivoted by the extension 2a1 such that they do not cause interference with the extension 2a1 when the extension 2a1 is swung.

As described above, each of the work support members 24a and 24b has the upper surface extending flush with the upper surface of the turntable 2 as well as the work placing surfaces 4a and 4b of the work support portions 4A and 4B. Therefore, when the work support members 24a and 24b are in positions as indicated by solid lines in FIG. 3, an effective width W2 which is considerably greater than the effective width W1 can be provided for supporting the work.

(SECOND EMBODIMENT)

Figure 7:
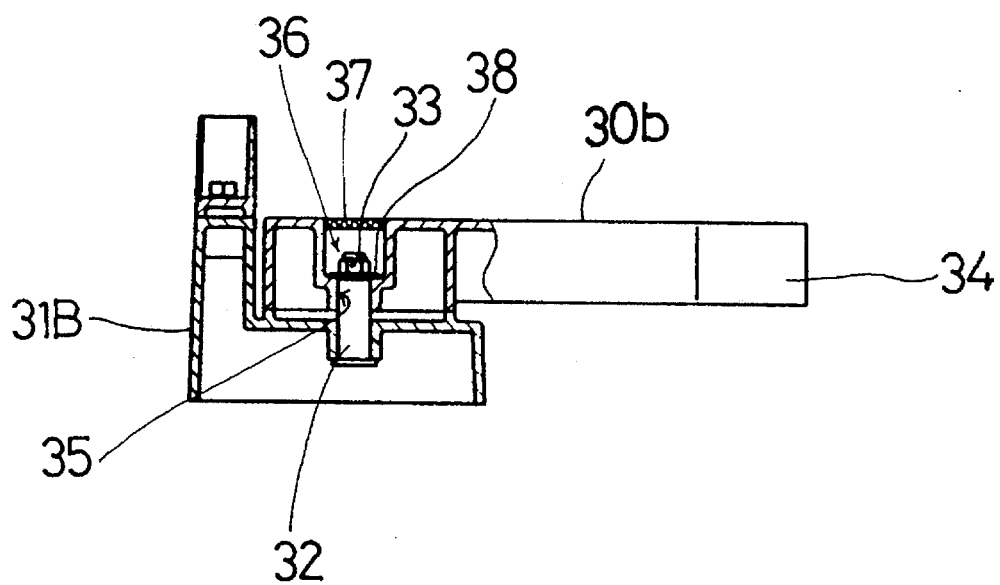
FIG. 7 is a sectional view taken along line VI—VI in FIG. 6.
Figure 5:
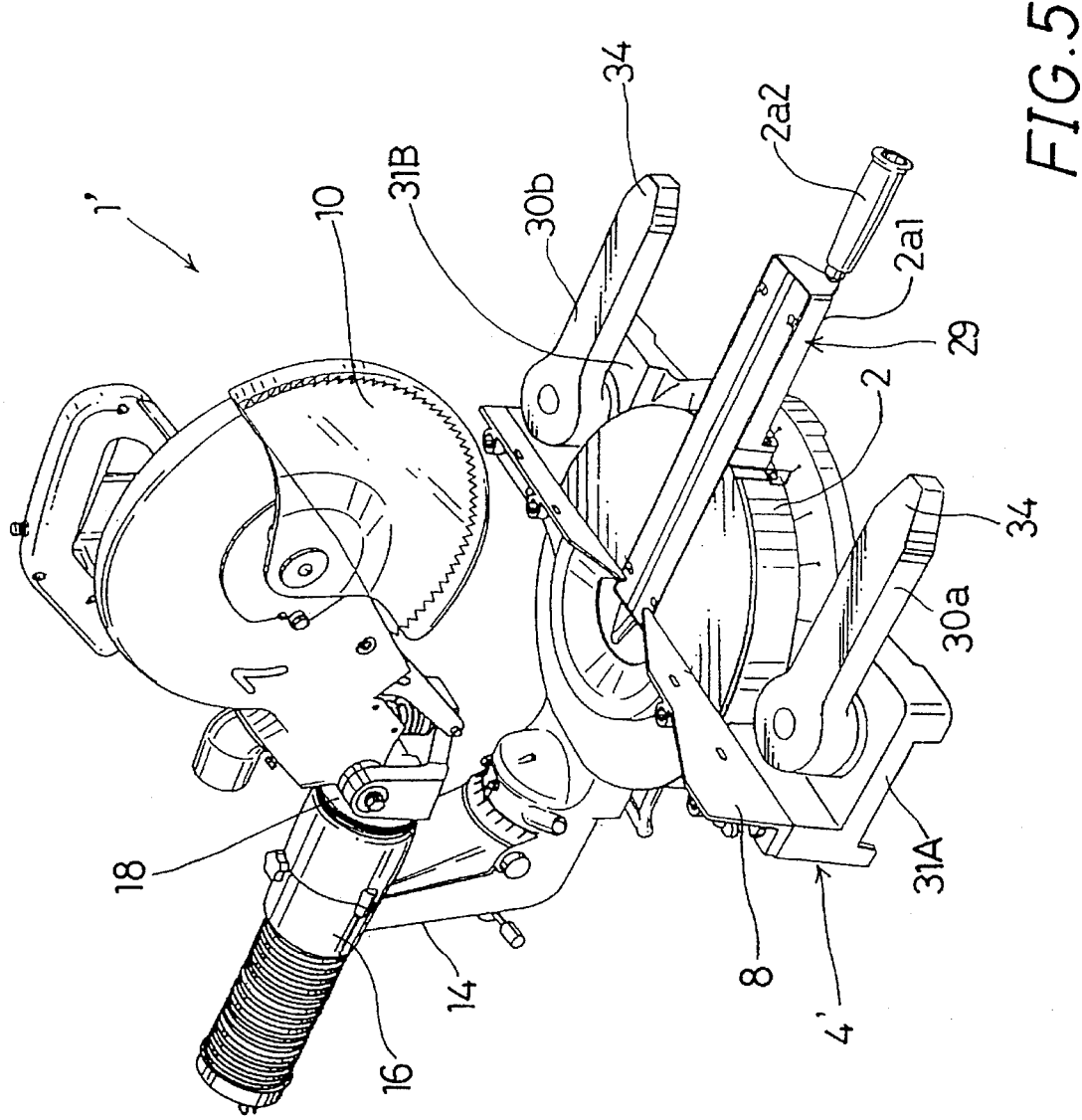
FIG. 5 is a perspective view of a slide miter saw according to a second embodiment of the present invention.
Figure 6:
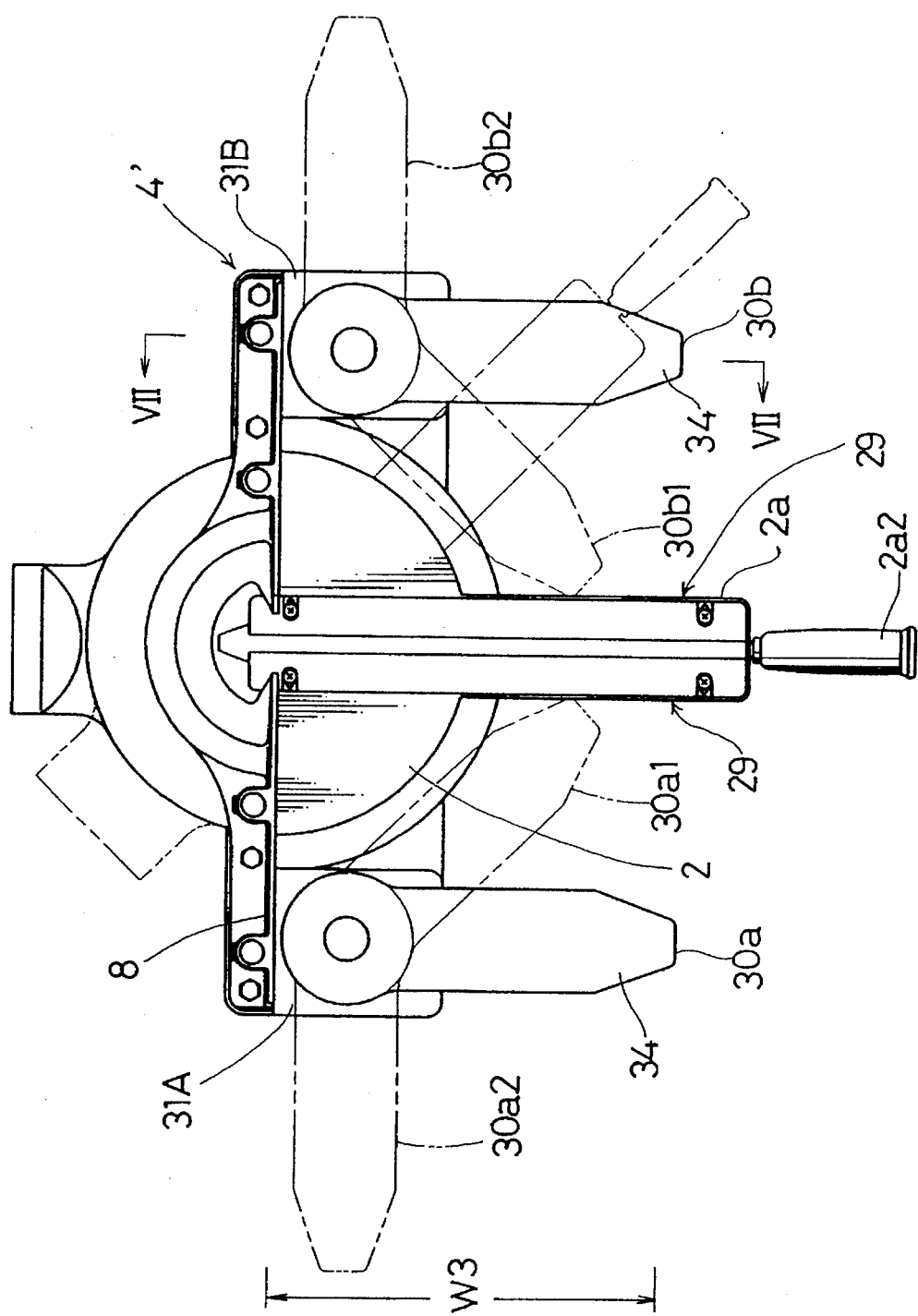
FIG. 6 is a plan view of a base, work support members and a turntable of the slide miter saw shown in FIG. 5.
Figure 8:
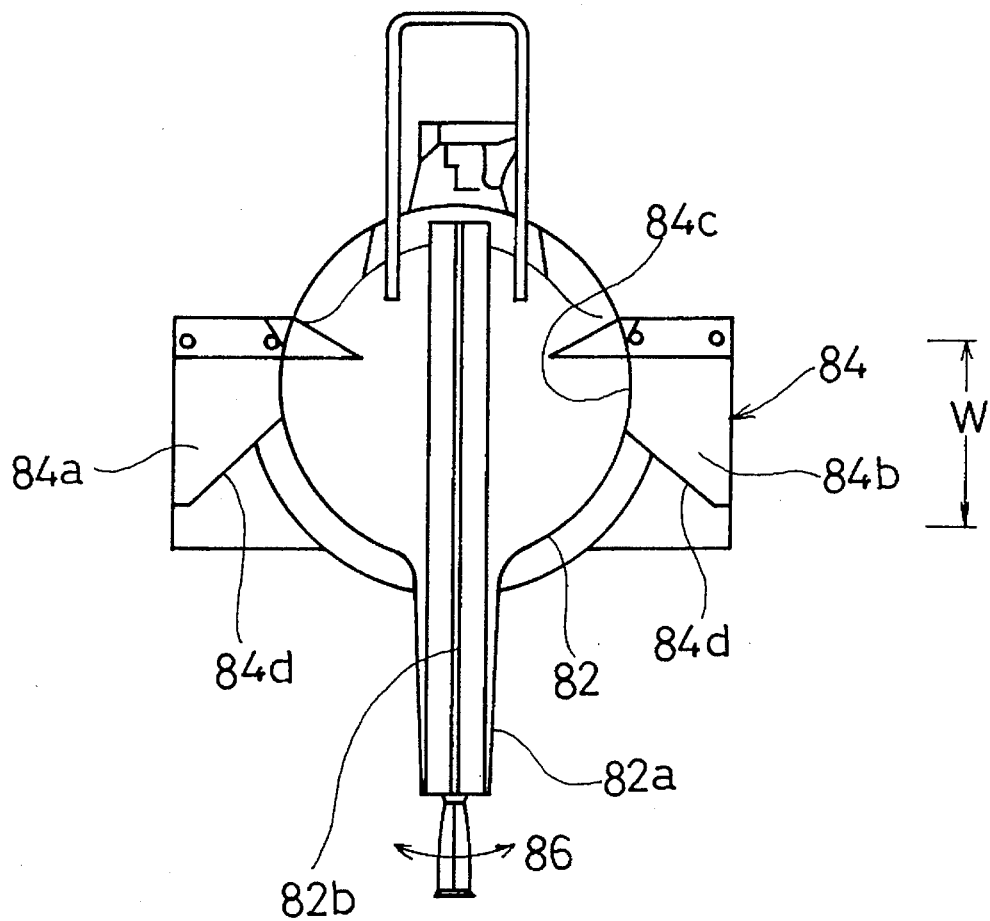
FIG. 8 is a plan view similar to FIGS. 3 and 6 but showing a conventional rotary cutting unit.

The second embodiment of the present invention will now be explained with reference to FIGS. 5 to 7. The second embodiment is a modification of the first embodiment. Parts that are the same as those in the first embodiment are given like reference numerals and their description will not be repeated.

A slide miter saw 1' of this embodiment includes a pair of work support members 30a and 30b in place of the support portions 4A and 4B having the work placing surfaces 4a and 4b of the first embodiment. The work support members 30a and 30b are mounted on mounting portions 31A and 31B formed on both sides of a base 4'. Each of the work support members 30a and 30b has an upper surface extending flush with the upper surface of the turntable 2 for supporting the work.

The construction of the work support member 30a is the same as the construction of the work support member 30b, and therefore, only the construction of the work support member 30b is explained with reference to FIG. 7. The work support member 30b has an elongated configuration and has one end which is pivotally mounted on the mounting portion 31B by means of a bolt 32 and a nut 33. The other end is formed as a tapered free end 34. The bolt 32 is fixed to the mounting portion 31B and has an upper portion slidably received within a hole 35 formed in the one end of the work support member 30b. The upper end of the bolt 32 is positioned within a circular recess 36 formed in series with the hole 35. The circular recess 36 has a larger diameter than the hole 35 and has an open upper end which is closed by a cap 37. The nut 33 is in engagement with the upper end of the bolt 32 and a washer 38 is interposed between the nut 38 and the bottom of the circular recess 36, so that the work support member 30b is pivotable around the bolt 32 but is fixed in position in direction of the pivotal axis or the vertical direction. This means that the work support member 30a and 30b are not intended to be removed from the base 4'.

Thus, similar to the work support members 24a and 24b of the first embodiment, the work support members 30a and 30b are pivotable between positions as indicated by 30a1 and 30a2 and between positions as indicated by 30b1 and 30b2, respectively. Further, the work support members 30a and 30b are forced to be pivoted through abutment between their tapered free ends 34 and the side surfaces 29 of the extension 2a1.

With the above embodiment, similar to the first embodiment, the extension 2a can be swung by a greater angle without being interfered with the work support members 30a and 30b, and a broader effective width W3 can be provided for supporting the work without enlarging the size of the miter saw 1'. Additionally, when the work support members 30a and 30b are positioned as indicated by 30a1 and 30b1, respectively, with the extension 2a positioned at the central position, a smaller space is occupied by the miter saw 1', so that the miter saw 1' can be easily conveyed and that a space for storing the miter saw 1' can be efficiently utilized.

Although in the above embodiments, the free ends 28 of the work support members 24a and 24b and the free ends 34 of the work support members 30a and 30b are rounded and tapered, respectively, such a free end may have a spoon-like or leaf-like configuration including convex curved surfaces on both sides. In this connection, protrusions may be formed on the side surfaces 29 of the extension 2a in a position adjacent the handle 2a2 such that the protrusions extend laterally from the side surfaces 29 by a short distance for cooperation with their corresponding convex curved surfaces of the work support members. With this construction, the work support members may not cause interference with the handle 2a2 even if they are long in size.

Further, although in the above embodiments, the present invention has been described in connection with miter saws having sliding mechanisms, the present invention can be adapted to any kinds of circular saw units having turntables. For example, the present invention can be adapted to miter saws having no horizontal sliding mechanisms and to circular saw units in which saw blades cannot be laterally inclined.

While the invention has been described with reference to preferred embodiments thereof, it is to be understood that modifications or variation may be easily made without departing from the spirit of this invention which is defined by the appended claims.

What is claimed is:

1. A circular saw unit comprising:

a base having work support means for supporting a work;

a turntable rotatably mounted on said base; and a cutting mechanism for cutting the work supported by said work support means;

said work support means including a pair of fixed work support portions formed on said base to opposed sides of said cutting mechanism, and a pair of work support members positioned adjacent said fixed work support portions, respectively, each work support member having a first end pivotally mounted on said base for rotation of the work support member around a pivotal axis substantially parallel to a rotational axis of said turntable, each of said work support portions having a first support surface formed thereon, and each of said work support members having a second surface formed thereon, said surfaces being substantially coplanar for cooperating support of work placed thereon;

an extension protruding radially outwardly from said turntable on a front side of said base, said extension being fixed to said turntable for rotation of said turntable as said extension is swung in an arcuate path about the axis of said turntable;

each of said work support members having a second free end, said support members being in the arcuate path of swing of said extension; and said extension having side surfaces formed on opposed sides thereon in the direction of said arcuate path, said side surfaces selectively abutting said work support members remote from the pivotally mounted first ends thereof for pivotal rotation of a selected one of said work support members as said extension is swung in said arcuate path to rotate said turntable and is brought to abut the selected one of said work support members.

2. The circular saw unit as defined in claim 1 wherein:

said work support portions are positioned in a diametrically opposed relationship with each other relative to said turntable;

said extension of said turntable is positioned between said work support portions on the front side of said base; and each of said work support members is pivotally movable between said extension and a corresponding one of said work support portions.

3. A circular saw unit comprising:

a base having work support means for supporting a work;

a turntable rotatably mounted on said base for rotation about a turntable axis; and a cutting mechanism for cutting the work supported by said work support means;

said work support means including a pair of elongate work support members disposed on spaced side portions of said base, each of said work support members having a first end pivotally mounted on said base for rotation of said work support member around a pivotal axis substantially parallel to the rotational axis of said turntable, each of said work support members having a work support surface formed thereon for placing the work;

an extension protruding radially outwardly from said turntable on a front side of said base, said extension being fixed to said turntable for rotation of said turntable as said extension is swung in an arcuate path about the turntable axis;

each of said work support members having a second end forming a free end, said work support members being in the arcuate path of swing of said extension; and said extension comprising means including side surfaces formed on opposed sides of said extension for pivotal rotation of a selected one of said work support members as said extension is swung in said arcuate path to abut the selected one of said work support members and forcibly pivot the selected one of said work members together with said extension in a swinging direction of said extension.

4. A circular saw unit comprising a base;

a cutting mechanism overlying said base and manipulatable thereacross and relative thereto;

a turntable mounted on said base and rotatable about a turntable axis perpendicular to said base, said turntable including a substantially planar upper work-supporting surface upwardly directed toward said cutting mechanism, an extension fixed to and radially extending from said turntable, said extension including a work-supporting upper surface coplanar with said turntable upper surface for cooperation therewith in the support of work, said extension defining handle means for rotational adjustment of said turntable as said extension is swung along an arcuate path;

at least one elongate work support member laterally of said turntable, said work support member having a first end pivotally mounted to said base about a work support member axis parallel to the turntable axis, said work support member extending into the arcuate path of said extension and being selectively engaged by said extension as said extension moves along said arcuate path, said work support member having an upper surface substantially coplanar with the upper surfaces of said turntable and said extension for cooperation therewith in the support of work, said work support member terminating in a free outer end and being pivotally adjustable about said work support member axis, said extension comprising means for pivotally adjusting said work support member about said work support member axis, said work support member pivotally adjusting in response to engagement of said extension therewith as said extension moves along said arcuate path toward and into engagement with said work support member at or adjacent the free outer end thereof wherein a free movement of the extension along the arcuate path is maintained in conjunction with a continuing support of the work.

5. The circular saw unit as defined in claim 4 wherein a second elongate work support member is positioned laterally of said turntable generally to a diametrically opposed side thereof from said one work support member, said second work support member similarly having a first end pivotally mounted to said base about an axis parallel to the turntable axis, said second support member extending into the arcuate path of said extension and being selectively engaged by said extension as said extension moves along said arcuate path, said second work support member having an upper surface substantially coplanar with the upper surfaces of said turntable and said extension, said second work support member terminating in a free outer end and being pivotally adjustable about the second work support member axis, said extension comprising means for pivotally adjusting said second work support member about its axis, said second work support member pivotally adjusting with said extension upon movement of said extension along said arcuate path towards and into engagement with said second support member, continuing movement of said extension effecting a corresponding continuing movement of said second support member.

6. The circular saw unit as defined in claim 5 wherein said base is of a predetermined width having a forward extent, said extension and said work support members all extending beyond said forward extent and being adjustable therebeyond for increasing the effective width of said base.

* * * * *